United States Patent
Nakayama et al.

(10) Patent No.: US 7,538,933 B2
(45) Date of Patent: May 26, 2009

(54) OPTICAL COMPOSITION FOR MULTI-COLOR DISPLAY AND MANUFACTURING METHOD THEREOF, AND OPTICAL ELEMENT AND DISPLAYING METHOD THEREOF

(75) Inventors: Daisuke Nakayama, Minamiashigara (JP); Ryojiro Akashi, Minamiashigara (JP); Hiroaki Tsutsui, Tokyo (JP)

(73) Assignee: Fuji Xerox Co., Ltd, Tokyo (JP)

( * ) Notice: Subject to any disclaimer, the term of this patent is extended or adjusted under 35 U.S.C. 154(b) by 567 days.

(21) Appl. No.: 11/280,125

(22) Filed: Nov. 16, 2005

(65) Prior Publication Data
US 2007/0008439 A1   Jan. 11, 2007

(30) Foreign Application Priority Data
Jun. 15, 2005   (JP)   ............................ 2005-175744

(51) Int. Cl.
    G02B 26/00   (2006.01)
(52) U.S. Cl. ........................ 359/296; 359/290
(58) Field of Classification Search ............... 359/296, 359/238, 290
See application file for complete search history.

(56) References Cited

U.S. PATENT DOCUMENTS

| | | | |
|---|---|---|---|
| 4,184,751 A | 1/1980 | Nicholson | |
| 6,426,827 B1 | 7/2002 | Bonhote et al. | |
| 6,580,545 B2 | 6/2003 | Morrison et al. | |
| 2001/0019037 A1* | 9/2001 | Zakhidov et al. | 216/56 |
| 2003/0010957 A1 | 1/2003 | Haering et al. | |
| 2003/0156313 A1 | 8/2003 | Serra et al. | |
| 2003/0189749 A1 | 10/2003 | Morrison et al. | |

FOREIGN PATENT DOCUMENTS

| | | |
|---|---|---|
| DE | 19905797 | 2/1999 |
| WO | 02/086611 | 10/2002 |

OTHER PUBLICATIONS

Wang, Congjun, Moonsub Shim, and Philippe Guyot-Sionnest. "Electrochromic Nanocrystal Quantum Dots." (Mar. 23, 2001). Science 291 (5512), 2390. [DOI: 10.1126/science.291.5512.2390].*

(Continued)

*Primary Examiner*—Jessica T Stultz
*Assistant Examiner*—Mahidere S Sahle
(74) *Attorney, Agent, or Firm*—Fildes & Outland, P.C.

(57) ABSTRACT

An optical element includes a pair of a transparent substrate and a back substrate which face each other with a predetermined gap by a spacer, and, a pair of the first electrode and the second electrode, and a periodic structural body as an optical composition for a multi-color display and an electrolytic solution are disposed within the gap of the transparent substrate and the back substrate. Metal ions contained in the electrolytic solution are deposited as metal atoms onto the periodic structural body of the optical composition for a multi-color display, to change a structural color of the periodic structural body. Display that can display a color and has a memory property can be obtained.

14 Claims, 5 Drawing Sheets

OTHER PUBLICATIONS

"Tunable electrochromic photonic crystals" Applied Physics Letters 86, 221110-1-3.
"Electrochromic tungsten oxide films: Review of progress 1993-1998" Solar Energy & Solar Cells, pp. 201-262.
K. Lee, S.A. Asher, J. Am. Chem. Soc., 122, 9534 (2000) Photonic Crystal Chemical Sensors: pH and Ionic.
T. Iyoda, et al., Polymer Preprints, Japan, 50 (3), 472 (2001).
H. Fudouzi and U. Xia, Adv. Mater., 15, 892-896 (2003) "Photonic Papers and Inks".
A document of Iridigm Corp (USA) Qualcomm MEMS Technologies, Nov. 2, 2005.

* cited by examiner

OPTICAL COMPOSITION FOR MULTI-COLOR DISPLAY AND MANUFACTURING METHOD THEREOF, AND OPTICAL ELEMENT AND DISPLAYING METHOD THEREOF

CROSS-REFERENCE TO RELATED APPLICATION

This application claims priority under 35 USC 119 from Japanese Patent Application No. 2005-175744, the disclosure of which is incorporated by reference herein

BACKGROUND OF THE INVENTION

1. Field of the Invention

The present invention relates to an optical composition for a multi-color display that makes use of a periodic structural body and a manufacturing method thereof. In addition, the present invention relates to an optical element that is applied in, for example, a display element or a light control element and a displaying method thereof.

2. Description of the Related Art

In recent years, displaying and color controlling devices that use color generation mechanisms based on "structural color" that utilizes a sub-micro scale periodic structural body (regular structural body) have been proposed. To date, color generation of structural colors that use periodic structural bodies utilizing colloidal crystals that use monodispersed fine particles of silica or a polymer, a micro-domain structure of a block copolymer, and a lamellar structure of a surfactant have been reported.

In particular, there are many reports on periodic structural bodies utilizing colloidal crystals, and they can be categorized into two kinds of structural bodies, namely, a loosely-packed type that makes use of the repulsive force between particles, and a closest packed type where particles are closely packed.

For example, there is a proposal where a colloidal crystal is fixed in a stimulation-responsive gel, a stimulation is inputted to alter the degree of swelling of the gel, so that a structural color is altered (for example, (1) K. Lee, S. A. Asher, J. Am. Chem. Soc., 122, 9534 (2000)).

Furthermore, a color control that makes use of an oxidization/reduction reaction of a matrix that fixes a colloidal crystal (for example, (2) T. Iyoda, et al., Polymer Preprints, Japan, 50 (3), 472 (2001)), and a color control due to swelling/refractive index variation owing to addition of a solvent (for example, (3) H. Fudouzi and U. Xia, Adv. Mater., 15, 892-896(2003)) are reported as well. Still furthermore, a display that uses a decolorization-color generation system of the structural color by means of contact-peeling by applying an electrical field to a laminated film is also proposed (for example, (4) a document of Iridigm Corp (USA)).

The structural colors in these proposals do not use dyes or pigments, but make use of the dielectric characteristics of a material being used and the reflection of a particular wavelength originating from a mesoscale structure; accordingly, it is considered the most effective method when multi-colors are emitted with a single element.

However, in the above-mentioned documents 1 through 3, since, the magnitude of a display site itself varies with variations in the degree of swelling of the gel, and since almost all colloidal crystals are electrically inactive, it is difficult to apply these methods to display elements under the present circumstances. Furthermore, in the document 4, although it is a display that carries out the decolorization and the color generation based on an electrical drive, it can perform only one of two ways of decolorization and color generation and cannot display multi-colors. That is, under the present circumstances, the characteristics of structural colors are not being fully utilized. Furthermore, according to these proposals, it is also difficult to realize color generation (display) having memory properties.

SUMMARY OF THE INVENTION

Accordingly, the present invention, in view of the above-mentioned problems, intends to provide an optical composition for a multi-color display that is capable of displaying multi-colors and can display with the memory properties and a manufacturing method thereof. Furthermore, the invention also intends to provide an optical element that makes use of the optical composition for a multi-color display and a display method thereof.

A first aspect of the invention is to provide an optical composition for a multi-color display comprising: a medium containing metal ions; and a periodic structural body which is brought into contact with the medium, whereby the metal ions are deposited as metal atoms on a surface of the periodic structural body.

A second aspect of the invention is to provide an optical element comprising: a medium containing metal ions; a periodic structural body which is brought into contact with the medium, whereby the metal ions are deposited as metal atoms on a surface of the periodic structural body; and an electrical field applying part that applies an electrical field to the periodic structural body.

A third aspect of the invention is to provide a displaying method using an optical element, comprising: providing an a medium containing metal ions; a periodic structural body which is brought into contact with the medium to deposit the metal ions as metal atoms on a surface of the periodic structural body, and an electrical field applying part for applying an electrical field to the periodic structural body; applying an electrical field applying to the periodic structural body to deposit metal ions in the medium as metal atoms on the periodic structural body, the medium contacting the surface of the periodic structural body; and applying an electrical field that is opposite to the electrical field to elute the deposited metal atoms into the medium as metal ions.

A fourth aspect according to the invention is to provide a method of manufacturing an optical composition for a multi-color display comprising a medium containing metal ions and a periodic structural body that is brought into contact with the medium to deposit the metal ions as metal atoms on a surface of the periodic structural body; the method comprising: filling gaps among particles of a colloidal crystalline structural body with an electrically conductive material; and removing the colloidal crystal to prepare the periodic structural body.

DETAILED DESCRIPTION OF THE INVENTION

Preferred embodiments according to the invention will be described hereinafter in detail. Numerals that have substantially same functions in all drawings are denoted by the same reference numerals, and explanations therefor may be omitted.

Figure 1:
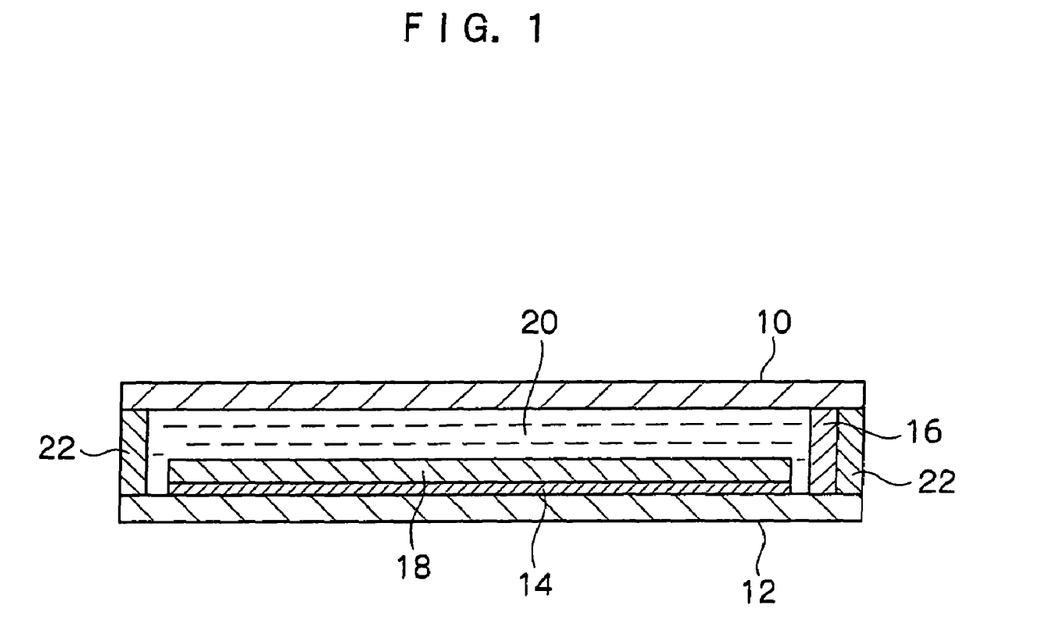
FIG. 1 is a schematic block diagram showing an optical element according an embodiment.

FIG. 1 is a schematic block diagram showing an optical element according to an embodiment. An optical element according to the embodiment, as shown in FIG. 1, includes a pair of a transparent substrate 10 and a back substrate 12 which face each other with a predetermined gap with a spacer 22, and a pair of a first electrode 14 and a second electrode 16, a periodic structural body 18 as an optical composition for a multi-color display and an electrolytic solution 20 (a medium containing a metal ion) are disposed within the gap of the transparent substrate 10 and the back substrate 12.

The periodic structural body 18 is brought into contact with the first electrode 14 as a layer and is disposed on a surface of the back substrate 12 together with the first electrode 14. On the other hand, the gap of the substrates is filled with the electrolytic solution 20 which is brought into contact with the periodic structural body 18 and is brought into contact with the second electrode 16 disposed on a surface of one of the spacers 22.

First, the periodic structural body 18 will be described. The periodic structural body has a periodic structure where two or more regions that have a magnitude of wavelengths of light and have different refractive indices from each other, are periodically arranged in a degree of sub-micro scale. One in which, under a certain condition, the periodic structure interferes with visible light to exhibit a color characteristic of the periodic structure can be used. The refractive index varies with deposition of the metal ion deposits on a surface of the periodic structural body to change color.

As such a periodic structural body 18, a photonic crystal structural body is particularly preferable. The photonic crystal structural body is a structural body that is optimized in applications to light among periodic structural bodies.

As the periodic structural body 18, specifically, a colloidal crystal structural body, a micro-domain structural body and a lamellar structural body can be exemplified; however, at least the surface of the periodic structural body 18 is required to be electrical conductive. However, in general, the structural body themselves do not have the electric conductivity.

Accordingly, as the periodic structural body 18, a positive structural body, tthe surface of which is covered with an electrically conductive material or a negative structural body (so-called hollow structural body), in which a gap between the structural body is filled with an electrically conductive material followed by removing the structural body, are utilized.

Here, as the colloidal crystal structural body, there are two types, one of which is a loose-packed structural body where the repulsion force between colloidal particles are used to pack and the other of which is a closest packed structural body where colloidal particles are closely packed. The colloidal particles include particles having, for example, a volume average particle diameter in the range of 10 to 1000 nm. Such particles include silica particles, polymer particles (polystyrene, polyester, polyimide, polyolefin, polymethyl (meth) acrylate, polyethylene, polypropylene, polyether sulfone, nylon, polyurethane, polyvinyl chloride and polyvinylidene chloride) and inorganic particles such as titanium oxide.

Such colloidal particle crystalline structural body can be prepared by, for example, an emulsion polymerization, a suspension polymerization, a two-stage mold polymerization, a chemical gas-phase reaction method, a heating method with an electric furnace, a thermal plasma method, a laser heating method, a vaporization method in gas, a co-precipitation method, a homogeneous precipitation method, a compound precipitation method, a metal alkoxide method, a hydro-thermal synthesis method, a sol-gel method, an atomizing method, a freezing method and a nitrate decomposition method.

A thickness of the colloidal crystal structural body is in the range of 100 nm to 5 mm, preferably in the range of 500 nm to 1 mm.

Furthermore, the micro-domain structural body is one that has a periodic structure of from several nanometers to sub-micrometers, which is obtained by making use of, for example, a block copolymer where different kinds of polymers are chemically bonded and the repulsion between the different kinds of polymers. As the block copolymer, for example, poly(styrene-co-isoprene) block copolymer, poly(styrene-co-butadiene) block copolymer, poly(styrene-co-vinylpyridine) block copolymer and poly(styrene-co-ethylene propylene) block copolymer are exemplified, and plural repetition units may be used.

Such a micro-domain structural body can be prepared, for example, by elevating a temperature to a temperature equal to or higher than a fluid temperature followed by cooling to be solidified, or by dissolving in a solvent followed by vaporizing the solvent to be solidified.

In the micro-domain structural body, the difference in the refractive indexes of the respective domains is preferably in the range of 0.1 to 10 and a characteristic length of the domain is preferably in the range of 10 to 1000 nm.

Furthermore, the lamellar structural body is one of the liquid crystalline structures where molecular films are stacked in layers and stabilized owing to the repulsion force between the molecular films. As a material that forms a molecular film, a surfactant can be used.

Such a lamellar structural body can be prepared, for example, by means of a sol-gel synthesis of alkoxy silane in a reaction field between the lamellar layers with multi-layer two-molecular films, for example by the use of a surfactant. Furthermore, the procedure, in which a hexagonal phase or a reverse-hexagonal phase formed by the surfactant is used as a reaction field, can also obtain a periodic structural body.

In the lamellar structural body, the difference in the refractive indexes of the respective layers is preferably in the range of 0.1 to 10 and an inter-layer distance is preferably in the range of 10 to 1000 nm.

Furthermore, the periodic structural body can be obtained by layering materials having different refractive indexes by use of a thin layer preparation method such as a vapor deposition method, a sputtering method, a coating method or a pulling-up method.

The electrically conductive material that covers on or fills in the structural body, includes carbon materials, metals (copper, aluminum, silver, gold, nickel, platinum, etc.), metal oxides (tin oxide and tin oxide-indium oxide (ITO)), electrically conductive polymers (polypyroles, polythiophenes, polyanilines, polyphenylene vinylenes, polyasens and polyacetylenes). Among these materials, the carbon materials are preferable because these are intrinsically black, the contrast of an resultant structural color can be improved.

Furthermore, when as an electrically conductive material that constitutes a negative structural body (hollow structural body) that is a periodic structural body 18, an electrically conductive polymer is used, the flexible properties (flexibility, bendability) of an optical element can be obtained.

The positive structural body of the periodic structural body 18 can be prepared by covering a surface of the colloidal crystal structural body, micro-domain structural body or lamellar structural body with an electrically conductive material by means of, for example, the plating or the electrolytic polymerization. After covering an electrically conductive material precursor, a process such as sintering may be applied to form an electrically conductive material.

On the other hand, the negative structural body (hollow structural body) of the periodic structural body 18 can be prepared in which gap of the colloidal crystalline structural body, micro-domain structural body or lamellar structural body are filled with an electrically conductive material, by means of, for example, the plating or electrolytic polymerization, followed by removing the structural body. After covering/filling an electrically conductive material precursor, a process such as sintering may be applied to form an electrically conductive material.

Figure 2A:
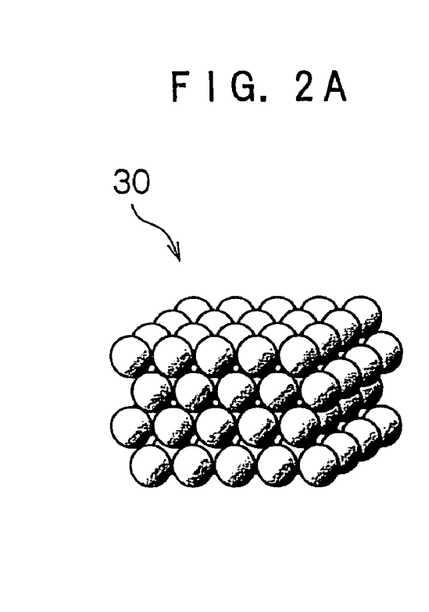
FIGS. 2A through 2C are schematic diagrams for describing a manufacture example of an optical element (periodic structural body) according to an embodiment.
Figure 2B:
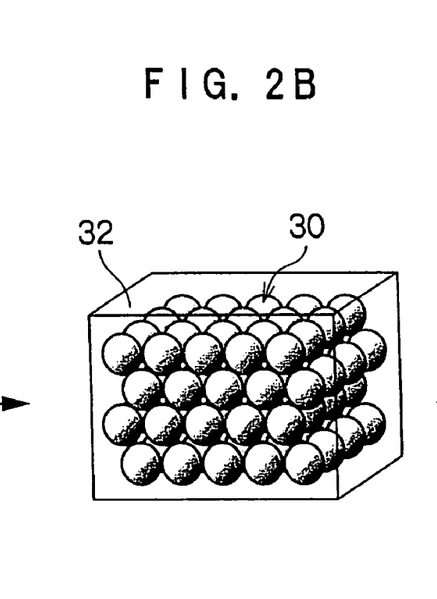
Figure 2C:
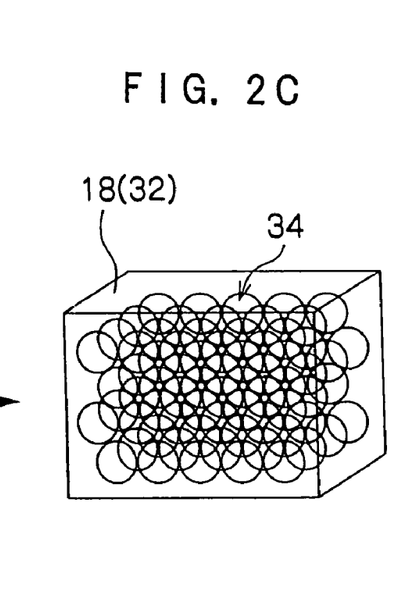

Specifically, for example, as shown in FIG. 2, a colloidal crystal structural body 30 made of, for example, silica particles is prepared (FIG. 2A), thereafter on surfaces and in gaps (particle gaps) of the colloidal crystal structural body 30, an electrically conductive material precursor such as a furfuryl alcohol resin is coated and packed followed by sintering, so that hardly graphitizable carbon as the electrically conductive material 32 is packed (FIG. 2B). Then, when the colloidal crystal structural body 30 is etched with hydrofluoric acid to be removed, a gap 34 having a same shape as the colloidal crystal structural body 30 is formed (FIG. 2C). Thus, the negative periodic structural body 18 made of the electrically conductive material 32 can be prepared.

Furthermore, as the periodic structural body 18, a group of particles obtained by pulverizing the negative structural body (hollow structural body) can be applied. When the negative structural body is pulverized, the interference of visible light attributed to the periodic structural body itself can be randomized, and as a result, dependency of the structural color on the angle of visibility derived from the periodic structure can be improved. The pulverization of the negative structural body is made to an extent that the structural color arising from the periodic structure does not disappear, that is, to the extent that the periodic structure is not destroyed. Specifically, the negative structural body is pulverized so that, as a characteristic value representing a magnitude of particles, a number-average particle diameter may be in the range of approximately 100 nm to 5 mm.

When materials are selected so that the difference between the refractive indexes of the periodic structural body 18 and the electrolytic solution 20 may be larger, the periodic structural body 18 is subdivided, or a thickness of the periodic structural body 18 is made thinner, the dependency of the structural color on the angle of visibility can be improved.

Specifically, the difference between the refractive indexes of the periodic structural body 18 and the electrolytic solution 20 is preferably in the range of, for example, approximately 0.1 to 10. The respective refractive indexes can be obtained with Abbe's refractometer.

Furthermore, a subdivision of the periodic structural body 18 can be made, for example, for each pixel of a square having one side in the range of 10 μm to 5 mm. Still furthermore, a thickness of the periodic structural body 18 is preferably in the range of 500nm to 5 mm.

Next, the electrolytic solution 20 will be described. The electrolytic solution 20 is a medium that contains a metal ion to be deposited onto the periodic structural body 18. The metal ions include titanium, vanadium, chromium, manganese, iron, cobalt, nickel, copper, zinc, gallium, germanium, silver, cadmium, and indium. Electrolytes that contain these metal ions, water; alcohols such as methyl alcohol, ethyl alcohol, propyl alcohol, butyl alcohol, ethylene glycol and propylene glycol; ketones such as acetone and methyl ethyl ketone; ethers; and esters, dimethyl formamide, dimethyl acetamide, dimethyl sulfoxide, acetonitrile, ethylene carbonate, propylene carbonate, tetrahydrofuran, pyrrolidone derivatives, aliphatic or aromatic organic solvents, silicone oils, ionic liquids and mixtures thereof are exemplified.

The concentration of the metal ion is preferably in the range of 0.01 to 50% by weight and more preferably in the range of 0.05 to 10% by weight. When the concentration of the metal ion is set in the above range, the metal ion can be suitably deposited onto the periodic structural body 18.

On the other hand, solvents in the electrolytic solution 20 include water, organic solvents, for example, alcohols such as methyl alcohol, ethyl alcohol, propyl alcohol, butyl alcohol, ethylene glycol and propylene glycol; ketones such as acetone and methyl ethyl ketone; ethers; and esters, dimethyl formamide, dimethyl acetamide, dimethyl sulfoxide, acetonitrile, ethylene carbonate, propylene carbonate, tetrahydrofuran, and pyrrolidone derivatives), oils (for example, aliphatic or aromatic organic solvents, and silicone oil); ionic liquids (for example, 1-ethyl-3-methyl imidazolium bromide, 1-ethyl-3-methyl imidazolium chloride, 1-ethyl-3-methyl imidazolium lactate, 1-ethyl-3-methyl imidazolium hexafluorophosphate, 1-ethyl-3-ethyl imidazolium bromide tetrafluoroborate, 1-ethyl-3-methyl imidazolium trifluoromethane sulfonate, 1-butyl-3-methyl imidazolium bromide, 1-butyl-3-methyl imidazolium chloride, 1-butyl-3-methyl imidazolium hexafluorophosphate, 1-butyl-3-methyl imidazolium bromide tetrafluoroborate, 1-butyl-3-methyl imidazolium trifluoromethane sulfonate, 1-butyl-3-methyl imidazolium lactate, 1-hexyl-3-methyl imidazolium bromide, 1-hexyl-3-methyl imidazolium chloride, 1-hexyl-3-methyl imidazolium lactate, 1-hexyl-3-methyl imidazolium hexafluorophosphate, 1-hexyl-3-methyl imidazolium bromide tetrafluoroborate, 1-hexyl-3-methyl imidazolium trifluoromethane sulfonate, 1-octyl-3-methyl imidazolium bromide, 1-octyl-3-methyl imidazolium chloride, 1-octyl-3-methyl imidazolium lactate, 1-octyl-3-methyl imidazolium hexafluorophosphate, 1-octyl-3-methyl imidazolium bromide tetrafluoroborate, 1-octyl-3-methyl imidazolium trifluoromethane sulfonate, 1-decyl-3-methyl imidazolium bromide, 1-decyl-3-methyl imidazolium chloride, 1-dectl-3-methyl imidazolium lactate, 1-decyl-3-methyl imidazolium hexafluorophosphate, 1-decyl-3-methyl imidazolium bromide tetrafluoroborate, 1-decyl-3-methyl imidazolium trifluoromethane sulfonate, 1-dodecyl-3-methyl imidazolium bromide, 1-dodecyl-3-methyl imidazolium chloride, 1-dodecyl-3-methyl imidazolium lactate, 1-dodecyl-3-methyl imidazolium hexafluorophosphate, 1-dodecyl-3-methyl imidazolium bromide tetrafluoroborate, 1-dodecyl-3-methyl imidazolium trifluoromethane sulfonate, 1-ethyl-2,3-dimethyl imidazolium bromide, 1-ethyl-2,3-dimethyl imidazolium chloride, 1-ethyl-2,3-dimethyl imidazolium lactate, 1-ethyl-2,3-dimethyl imidazolium hexafluorophosphate, 1-ethyl-2, 3-dimethyl imidazolium bromide tetrafluoroborate, 1-ethyl-2,3-dimethyl imidazolium trifluoromethane sulfonate, 1-butyl-2,3-dimethyl imidazolium bromide, 1-butyl -2,3-dimethyl imidazolium chloride, 1-butyl-2,3-dimethyl imidazolium hexafluorophosphate, 1-butyl-2, 3-dimethyl imidazolium bromide tetrafluoroborate, 1-butyl-2,3-dimethyl imidazolium trifluoromethane sulfonate, 1-butyl-2,3-dimethyl imidazolium lactate, 1-hexyl -2,3-dimethyl imidazolium bromide, 1-hexyl-2,3-dimethyl imidazolium chloride, 1-hexyl-2,3-dimethyl imidazolium lactate, 1-hexyl-2,3-dimethyl imidazolium hexafluorophosphate, 1-hexyl-2,3-dimethyl imidazolium bromide tetrafluoroborate, 1-hexyl-2,3-dimethyl imidazolium trifluoromethane sulfonate, 1-octyl-2,3-dimethyl imidazolium bromide, 1-octyl -2,3-dimethyl imidazolium chloride, 1-octyl-2,3-dimethyl imidazolium lactate, 1-octyl-2,3-dimethyl imidazolium hexafluorophosphate, 1-octyl-2,3-dimethyl imidazolium bromide tetrafluoroborate, 1-octyl-2,3-dimethyl imidazolium trifluoromethane sulfonate, 1-decyl-2, 3-dimethyl imidazolium bromide, 1-decyl-2,3-dimethyl imidazolium chloride, 1-decyl-2, 3-dimethyl imidazolium lactate, 1-decyl-2,3-dimethyl imidazolium hexafluorophosphate, 1-decyl-2,3-dimethyl imidazolium bromide tetrafluoroborate, 1-decyl-2, 3-dimethyl imidazolium trifluoromethane sulfonate, 1-dodecyl-2,3-dimethyl imidazolium bromide, 1-dodecyl-2, 3-dimethyl imidazolium chloride, 1-dodecyl-2,3-dimethyl imidazolium lactate, 1-dodecyl-2,3-dimethyl imidazolium hexafluorophosphate, 1-dodecyl-2,3-dimethyl imidazolium bromide tetrafluoroborate, 1-dodecyl-2,3-dimethyl imidazolium trifluoromethane sulfonate, 1-ethylpyridinium bromide, 1-ethylpyridinium chloride, 1-ethylpyridinium lactate, 1-ethylpyridinium hexafluorophosphate, 1-ethylpyridinium tetrafluoroborate, 1-ethylpyridinium trifluoromethane sulfonate, 1-butylpyridinium bromide, 1-butylpyridinium chloride, 1-butylpyridinium lactate, 1-butylpyridinium hexafluorophosphate, 1-butylpyridinium tetrafluoroborate, 1-butylpyridinium trifluoromethane sulfonate, 1-hexylpyridinium bromide, 1-hexylpyridinium chloride, 1-hexylpyridinium lactate, 1-hexylpyridinium hexafluorophosphate, 1-hexylpyridinium tetrafluoroborate, and 1-hexylpyridinium trifluoromethane sulfonate). In particular, the ionic liquid can be preferably used as the solvent in the electrolytic solution 20. The ionic liquids have particularly a lower volatility as compared with that of other solvents; accordingly, the optical element can be stabilized over a long period of time.

In the above embodiment, a mode where a liquid electrolytic solution 20 is used as a medium containing a metal ion is described. However, the medium is not limited to a liquid form, but also may be a gel-like form obtained by gelling the electrolytic solution 20 with a gelling agent or a solid form obtained by solidifying the electrolytic solution 20 with a polymer.

Next, an electrode will be described. As constituent materials of a first electrode 14 and a second electrode 16 as an electrical field applying means, electrodes made of a carbon material, a metal (copper, aluminum, silver, gold, nickel, platinum, etc.), a metal oxide (tin oxide, tin-oxide-indium oxide (ITO), etc.), an electrically conductive polymer (polypyroles, polythiophenes, polyanilines, polyphenylene vinylenes, polyasens, polyacetylenes, etc.) and a composite material made of the electrically conductive polymer and particles of the metal or metal oxide can preferably be used.

In particular, the second electrode 16 that is brought into contact with the electrolytic solution 20 (a medium containing a metal ion) is preferably formed of the same metal as the metal ion contained in the electrolytic solution 20. Accordingly, when a voltage is applied between the electrodes to apply an electrical field to the periodic structural body 18, the metal ions are eluted from the second electrode 16 when the metal ions deposit to the periodic structural body 18, the metal ions deposit to the second electrode when the deposits of the metal ions of the periodic structural body 18 are eluted. Accordingly, the concentration of the metal ion in the electrolytic solution 20 is stabilized, resulting in occurrence of stabilized deposition/elution, that is, color control can be stabilized.

The electrical field applying part is not limited to the electrode, but, may be one that is constituted of an electrically conductive material. For example, a metal such as titanium, vanadium, chromium, manganese, iron, cobalt, nickel, copper, zinc, gallium, germanium, silver, cadmium or indium; a polymer such as polyacetylene, polyparaphenylene, polymethylthiophene, polypyrrole, polyaniline or polyphenylene vinylene; a resin where metal particles or carbon particles are blended with a polymer matrix to impart the electrical conductivity, or a carbon material can be exemplified.

As a constituent material of the transparent substrate 10 and the back substrate 12, a film or a planar substrate formed of polyester, polyimide, polyolefin, an acrylic resin such as a poly(meth)acrylic resin, polystyrene, polyethylene, polypropylene, polyether sulfone, nylon, polyurethane, polyvinyl chloride, or polyvinylidene chloride, a plate-shape substrate, a glass substrate, a metal, a metal film or ceramics can be used. In particular, when a bendable film substrate is used as the transparent substrate 10 and the back substrate 12, an optical element having the flexible properties (flexibility, bendability) can be obtained.

The spacer 22, for example, can be made of a resin, metal oxide or glass. Furthermore, the spacers 22, though not particularly limited to, are disposed so that a gap between the substrates can be a sufficient and uniform so as to maintain a apace capable of disposing an electrically insulating solution, the periodic structural body 18 and the electrolytic solution 20.

The shape of the spacera 22, is not particularly restricted, as far as the spacers can stably maintain the gap. For example, spacers having an independent shape such as a circular, cubic or columnar shape can be preferably used.

In addition, the optical element according to the embodiment, other than the above-mentioned constituent elements, may be provided with a constituent element such as a surface protective layer, a color filter layer, an UV-absorption layer, a reflection preventive layer, a wiring, an electric circuit, an IC, an LSI, and a power supply.

Each of the constituent element is preferably constituted of a material that is non-decomposable or inert even under a voltage that applies an electrical field that deposits (or elutes) the metal ion to the periodic structural body 18.

In the optical element according to the embodiment having such a configuration, when a voltage is applied to a pair of the first electrode 14 and the second electrode 16, which is an electrical field applying means, an electrical field is applied to the periodic structural body 18. Metal ions deposit at an interface between the periodic structural body 18 and the electrolytic solution 20, by applying the electrical field, the average refractive index varies with the metal deposit deposited on the surface, so that the structural color derived from the periodic structural body changes.

On the other hand, when a voltage opposite to the above-applied voltage is applied to the pair the first electrode 14 and the second electrode 16, an electrical field opposite to the electrical field is applied to the periodic structural body 18. Owing to the reverse electrical field, the metal deposit deposited at the interface between the periodic structural body 18 and the electrolytic solution 20 is eluted into the electrolytic solution 20. When the metal deposit deposited on the surface disappears, the average refractive index varies and the color changes to the structural color arising from the periodic structural body.

Thus, when the average refractive index varies with the deposit of the metal ion, the color can change. However, sinceanextent of change in the average refractive index is different, owing to an amount of the deposit of the metal ion as well, the color control can be made based on an amount of the deposit. The control of an amount of the deposit can be appropriately carried out with an intensity of the electrical field to be applied (applied voltage and amount of current) and time.

In the case that the electrical field is applied intermittently, continuously, or with variation of the intensity of the electrical field (applied voltage and amount of current), the deposition density of the metal ion can be altered, accordingly, by making use of the deposition density, a delicate color control can be made.

Furthermore, the deposit of the metal ion, as the deposit is a metal simple body, can be stably present on the surface of the periodic structural body 18.

Here, a mechanism by which the periodic structural body 18 forms a structural color and a mechanism of the color control owing to the deposition of the metal ion onto the periodic structural body will be explained with reference to a colloidal crystal structural body as an example.

Figure 3:
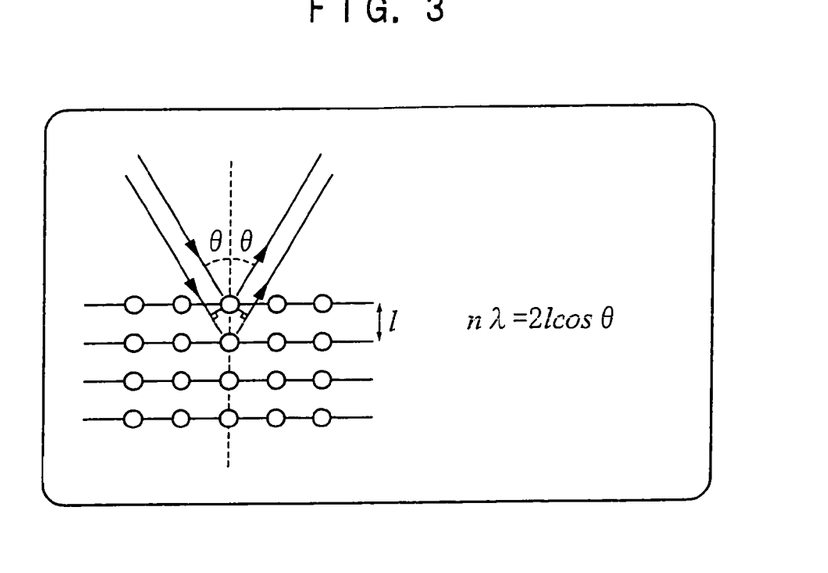
FIG. 3 is a diagram for explaining Brag's law.

First, as shown in FIG. 3, Brag's law (Formula 1 below) that is used for the crystalline structure analysis by means of the X-ray diffraction can be applied to the mechanism of the interference of visible light attributed to the colloidal crystalline structure body.

[Formula 1]

$$m\lambda = 2l \cos \theta \quad (1)$$

In the Formula 1, m, $\lambda$, l and $\theta$, respectively, denote a constant, a wavelength of light, a lattice constant and an incident angle. However, a procedure according to the X-ray diffraction cannot be applicable to the interference in the colloidal crystal structural body because a ratio of scales of a wavelength and an object is largely different therebetween. That is, since the magnitude of the colloidal crystal structural body is substantially same as the wavelength of visible light, the refractive index has to be taken into consideration.

Figure 4:
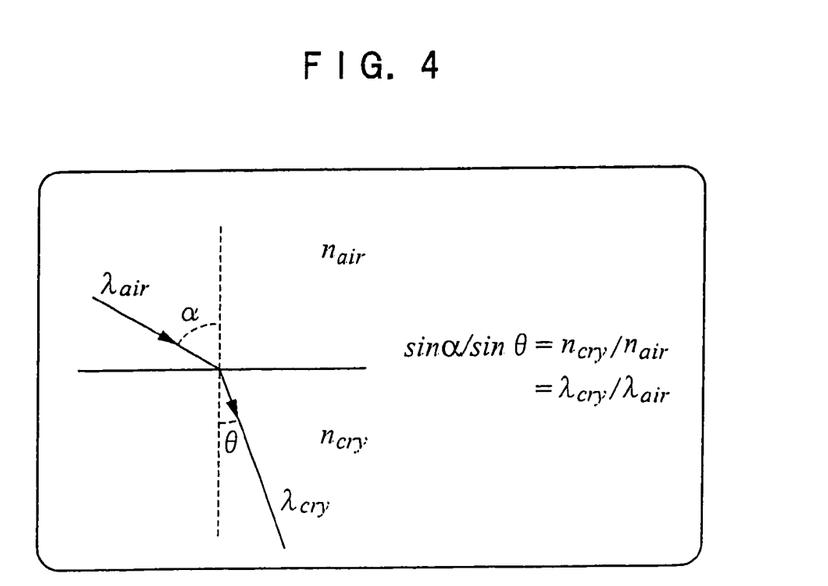
FIG. 4 is a diagram for explaining Snell's law.

Therefore, as shown in FIG. 4, the relationship between a wavelength ($\lambda_{air}$) of light impinging upon the colloidal crystalline structural body at an angle $\alpha$ and a wavelength ($\lambda_{cry}$) of light refracted at an angle $\theta$ by the colloidal crystal structural body, when $n_{air}$ and $n_{cry}$, respectively, are the refractive index of air and the refractive index of the colloidal crystal structural body, can be expressed by Formula (2) (Snell's law).

[Formula 2]

$$\sin \alpha / \sin \theta = n_{cry}/n_{air} = \lambda_{air}/\lambda_{cry} \quad (2)$$

Figure 5:
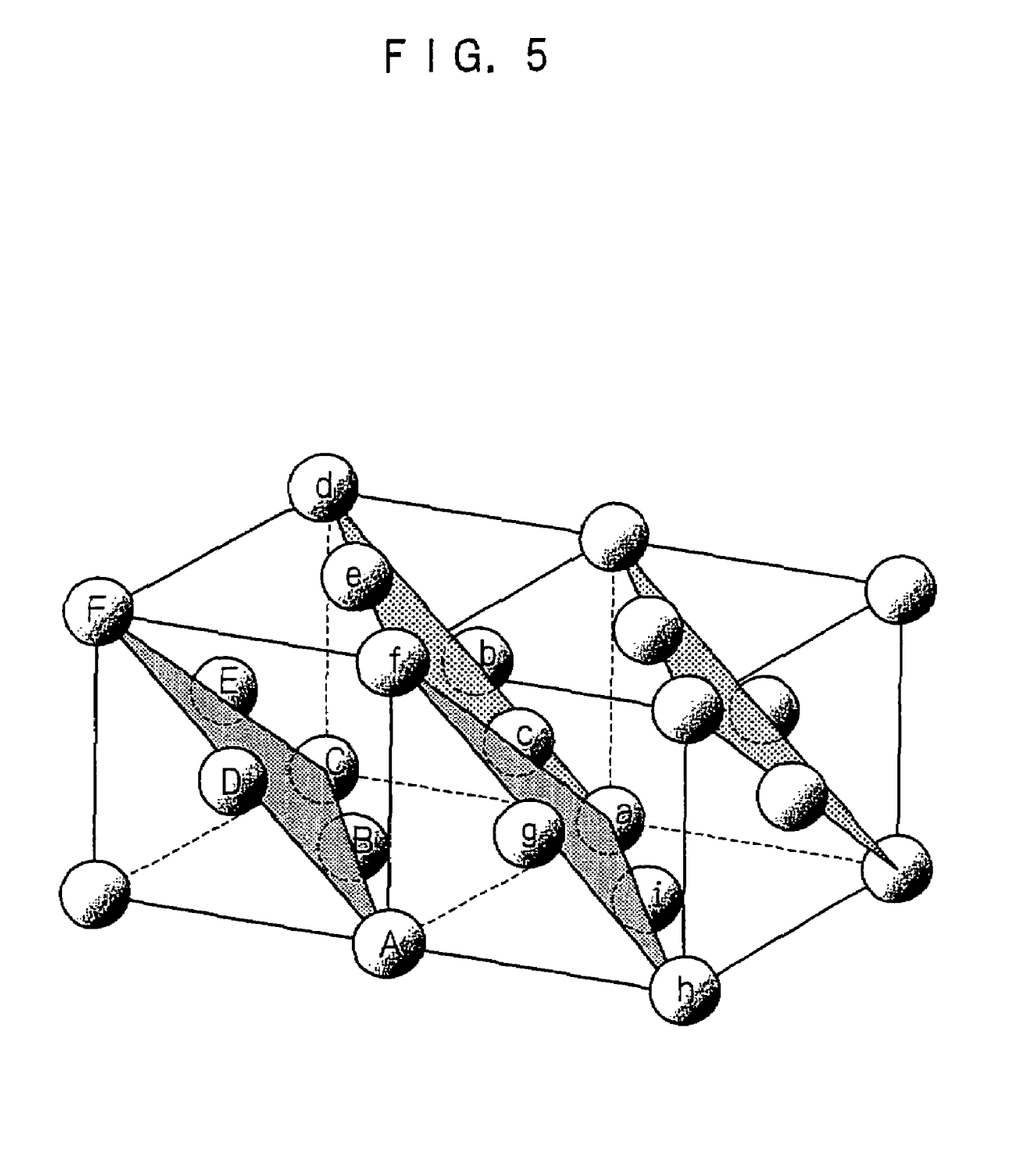
FIG. 5 is a schematic diagram showing a crystalline structure of a face-centered cubic crystal.

Furthermore, as shown in FIG. 5, since the colloidal crystal structural body has, as a surface layer, a (111) face of a face-centered cubic crystal that is most stable from a viewpoint of energy (an ACF face and a hdfa face in FIG. 5), when a particle diameter (volume-average particle diameter) of the colloidal particle is expressed by D, a lattice constant is represented by Formula (2'), and when summarizing the Formulas (1) and (2), Formula (3) can be obtained.

[Formula 2']

$$l = \sqrt{2/3} D$$

[Formula 3]

$$\lambda = 2(2/3)^{1/2} D[(n_{ave}/n_{air})^2 - \sin^2 \alpha]^{1/2}$$

$$(n_{ave}^2 = n_{air}^2 \phi_{air} + n_{cry}^2 \phi_{colloid})$$

Here, in Formula (3), $n_{air}$ and $n_{cry}$ represent the refractive indexes of air and the colloidal particle, respectively, and $\phi_{air}$ and $\phi_{colloid}$ represent volume fractions of air and the colloidal particles, respectively. When $\lambda$ is within the range of visible light (400 to 800 nm), the structural color can be perceived.

When such a colloidal crystal structural body is structurally controlled in a nano order level and a periodic structure is incorporated therein to an extent of a wavelength of light, the structural color can be controlled. A reflection wavelength obtained from the closest packed colloidal crystal structural body can be expressed by Formula (4) by adding the refractive index of the deposit (deposit of the metal ion) to the Formula (3).

[Formula 4]

$$\lambda = 2(2/3)^{1/2} D[(n^*_{ave}/n_{solution})^2 - \sin^2 \alpha]^{1/2}$$

$$(n^*_{ave}^2 = n_{solution}^2 \phi_{cry} + n_{PC}^2 \phi_{air} + n_{deposition}^2 \phi_{deposition})$$

In the Formula (4), $n_{solution}$, $n_{PC}$ and $n_{deposition}$ denote the refractive indexes of the electrolytic solution, colloidal crystal structural body and deposit, respectively, and $\phi_{deposition}$ denotes a volume fraction of the deposit. Furthermore, $\phi_{cry}$ is equal to $\phi_{colloid}$. When the angle of visibility of the colloidal crystal structural body is neglected (for example, when the dependency of the angle of visibility is improved according to the above procedure, the angle of visibility can be neglected), the Formula (4) can be rewritten into Formula (5).

[Formula 5]

$$\lambda = 2(2/3)^{1/2} D(n^*_{ave}/n_{solution})$$

That is, from the Formula (5), it is shown that the structural color of the colloidal crystal structural body can vary with the deposit of the metal ion. Furthermore, it is also shown that the color control can be made based on an amount of the deposit of the metal ion, that is, for example, based on the amount of current.

Thus, multi-colors can be displayed by the optical element according to the embodiment, and further, a displaying with the memory properties is possible. Furthermore, the multi-color is displayed, since a magnitude of the optical composition for the multi-color display is not caused to vary, the display for each pixel can easily be made.

Figure 6:
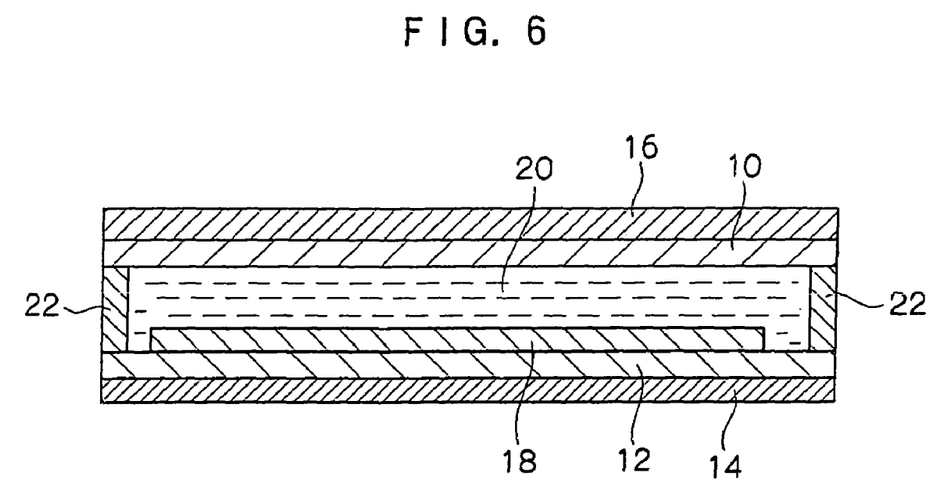
FIG. 6 is a schematic block diagram showing an optical element according to another embodiment.

In the optical element according to the embodiment, a mode where the first electrode 14 and the second electrode 16 as the electrical field applying part are brought into contact with the periodic structural body 18 as the optical composition for a multi-color display and the electrolytic solution 20 (medium containing the metal ion) is described. However, the first electrode 14 and the second electrode 16, as far as these can apply an electrical field to the periodic structural body 18, may be disposed without coming into contact therewith. For example, as shown in FIG. 6, the first electrode 14 and the second electrode 16 may be disposed on outer surfaces (faces that do not face each other) of the transparent substrate 10 and the back substrate 12, respectively.

Figure 7:
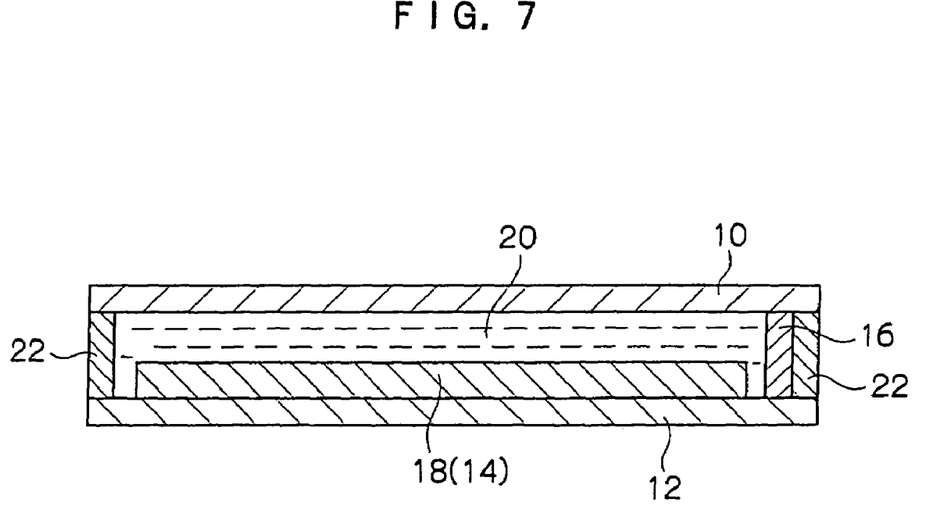
FIG. 7 is a schematic block diagram showing an optical element according to another embodiment.

Furthermore, in the optical element according to the embodiment, a mode where the first electrode 14 as the electrical field applying part is separately disposed is described. However, as shown in FIG. 7, the periodic structural body 18 can also serve as the first electrode 14. Accordingly, the space can be saved.

Still furthermore, in the optical element according to the embodiment, a mode where the first electrode 14 and the second electrode 16 are disposed as the electrical field applying means to apply an electrical field to the periodic structural body 18 so that the metal ion is deposited (or elution of the deposit) is described. However, when an electroless plating bath is applied as a medium containing the metal ion, without necessitating the electrical field applying part, without applying an electrical field, by the electroless plating, the metal ion can be deposited onto the periodic structural body 18 so that the color control of the periodic structural body 18 can also be made.

Furthermore, the optical element according to the embodiment describes a configuration of the minimum unit (one pixel unit). However, when the minimum units are arranged in matrix, the color display can be easily carried out. Some embodiments of the invention are outlined below.

A first embodiment of the invention is to provide an optical composition for a multi-color display comprising: a medium containing metal ions; and a periodic structural body which is brought into contact with the medium, whereby the metal ions are deposited as metal atoms on a surface of the periodic structural body.

A second embodiment of the invention is to provide an optical composition for a multi-color display according to the first aspect, wherein the periodic structural body is a photonic crystalline structural body.

A third embodiment of the invention is to provide an optical composition for a multi-color display according to the first aspect, wherein the periodic structural body is a hollow structural body.

A fourth embodiment of the invention is to provide an optical composition for a multi-color display according to the third aspect, wherein the hollow structural body is made of a carbon material.

A fifth embodiment of the invention is to provide an optical composition for a multi-color display according to the first aspect, wherein the periodic structural body comprises a powder group obtained by pulverizing a hollow structural body.

A sixth embodiment of the invention is to provide an optical composition for a multi-color display according to the first aspect, wherein the metal ions deposit as metal atoms at an interface between the periodic structural body and the medium.

A seventh embodiment of the invention is to provide an optical composition for a multi-color display according to the first aspect, wherein the medium contains an ionic liquid.

An eighth embodiment of the invention is to provide an optical element comprising: a medium containing metal ions; a periodic structural body which is brought into contact with the medium, whereby the metal ions are deposited as metal atoms on a surface of the periodic structural body; and an electrical field applying part that applies an electrical field to the periodic structural body.

A ninth embodiment of the invention is to provide an optical element according to the eighth aspect, wherein the electrical field applying part comprises an electrically conductive material.

A tenth embodiment of the invention is to provide an optical element according to the eighth aspect, wherein the electrical field applying part is a pair of electrodes comprising a first electrode and a second electrode.

An eleventh embodiment of the invention is to provide an optical element according to tenth aspect, wherein the first electrode is disposed so as to come into contact with the periodic structural body; and the second electrode is disposed so as to come into contact with the medium and is formed of the same metal as the metal ions.

A twelfth embodiment of the invention is to provide a displaying method using an optical element, comprising: providing an a medium containing metal ions; a periodic structural body which is brought into contact with the medium to deposit the metal ions as metal atoms on a surface of the periodic structural body, and an electrical field applying part for applying an electrical field to the periodic structural body; applying an electrical field applying to the periodic structural body to deposit metal ions in the medium as metal atoms on the periodic structural body, the medium contacting the surface of the periodic structural body; and applying an electrical field that is opposite to the electrical field to elute the deposited metal atoms into the medium as metal ions.

A thirteenth embodiment of the invention is to provide a displaying method using an optical element according to the twelfth aspect, wherein a color is controlled in accordance with an amount of the deposited metal atoms.

A fourteenth embodiment according to the invention is to provide a method of manufacturing an optical composition for a multi-color display comprising a medium containing metal ions and a periodic structural body that is brought into contact with the medium to deposit the metal ions as metal atoms on a surface of the periodic structural body; the method comprising: filling gaps among particles of a colloidal crystalline structural body with an electrically conductive material; and removing the colloidal crystal to prepare the periodic structural body.

EXAMPLES

Hereinafter, the invention will be explained with reference to examples in detail. However, the scope of the invention is not limited to the examples. In the examples (excluding example 12), an optical element having the same configuration as the optical element shown in FIG. 1 are prepared and evaluated.

Example 1

An aqueous suspension of mono-disperse colloidal silica (a volume-average particle diameter of the colloidal particles is approximately 200 nm) is coated on a carbon electrode, followed by vaporizing water in a thermostatic chamber at 100° C., so that a closest packed colloidal silica crystal structural body is prepared.

Next, gaps among particles of the colloidal silica crystal structural body as a mold are filled with furfuryl alcohol resin, followed by sintering at a temperature of 1000° C., further followed by etching the colloidal silica crystal structural body with hydrofluoric acid, so that a hollow structural body (negative structural body: the refractive index, 2.0 to 0.33i) made of carbon having a thickness of 0.5 mm is obtained. The obtained hollow structural body forms a structural color. Furthermore, when the hollow structural body is observed by the use of a scanning electron microscope (SEM), it is observed that a porous body is formed where gaps having the same shape as those of the colloidal silica crystal structural body are formed and all pores link to each other.

By using a carbon electrode where the hollow structural body are layered, an optical element in which the hollow structural body is used as the periodic structural body 18, the carbon electrode is used as the first electrode 14, a silver electrode is used as the second electrode, and an aqueous solution of silver cyanide (concentration: 2 g/l, the refractive index: 0.18 to 0.34i) is used as the electrolytic solution 20 is prepared (FIG. 1). As the transparent substrate 10 and the back substrate 12, glass substrates are used, respectively.

When a voltage (the current density: 1.5 to 2.5 A/dm$^2$) is applied by a carbon electrode (the first electrode 14) side of the optical element as a negative electrode and a silver electrode (the second electrode 16) side as a positive electrode, the structural color of the hollow structural body (periodic structural body 18) varies continuously from blue to yellow, to green, and to red, silver deposits on a surface (at an interface of the structural body with the silver cyanide solution) of the hollow structural body, so that the variation of the refractive index due to the deposits results in continuous color control.

Furthermore, when the voltage is reversed, the structural color varies from red to green, to yellow, and to blue. Even after the voltage is reversed many times, the similar behavior is shown. That is, excellent reversibility is confirmed. Still furthermore, when the voltage application is stopped in the process, a color at the moment when the voltage is stopped is maintained, that is, an excellent memory property is also confirmed.

Furthermore, since the silver ion is contained in the electrolytic solution 20 and the silver electrode (the second electrode 16) that comes into contact with the electrolytic solution are the same kind of the metal, when the metal ion deposits to the hollow structural body, the silver ion is eluted from the silver electrode. Thereby, the concentration of the silver ion in the electrolytic solution 20 becomes constant so that stable color control can be made.

Example 2

Except that an aqueous solution of gold potassium cyanide (the concentration: 2 g/l and the refractive index: 0.34 to 0.32i) is used as the electrolytic solution 20, an optical element is prepared by a similar manner to Example 1. Similarly, when a voltage is applied by the carbon electrode as the negative electrode and the silver electrode as the positive electrode, the structural color of the hollow structural body varies continuously from blue to yellow, to green, and to red, and when the voltage is reversed, the structural color varies from red to green, to yellow and to blue.

Furthermore, even after the voltage is reversed many times, the similar behavior is observed; that is, an excellent reversibility similar to Example 1 is confirmed. Still furthermore, when the voltage application is stopped in this process, a color at the moment when the voltage is stopped is maintained, that is, an excellent memory property is also confirmed.

However, since gold ion is contained in the electrolytic solution 20 and the silver electrode (the second electrode 16) that comes into contact with the electrolytic solution are different, when the gold ion deposits onto the hollow structural body, a concentration of the gold ion in the electrolytic solution 20 is lowered, the difference between the refractive indexes becomes remarkable. Thereby, more rapid change in the color tone can be achieved.

Example 3

Except that an aqueous solution of copper cyanide (the concentration: 2 g/l and the refractive index: 0.6 to 0.36i) is used as the electrolytic solution 20, an optical element is prepared by a similar manner to Example 1. Similarly, when a voltage is applied by the carbon electrode as the negative electrode and the silver electrode as the positive electrode, the structural color of the hollow structural body varies continuously from blue to yellow, to green and to red, and when the voltage is reversed, the structural color varies from red to yellow and to blue.

Furthermore, even after the voltage is reversed many times, the similar behavior is shown; that is, an excellent reversibility similar to Example 1 is confirmed. Still furthermore, when the voltage application is stopped in this process, a color at the moment when the voltage is stopped is maintained, that is, an excellent memory property is also confirmed.

Example 4

Except that an aqueous solution of nickel sulfate heptahydrate (the concentration: 100 g/l and the refractive index: 1.8 to 0.36i) is used as the electrolytic solution 20, an optical element is prepared by a similar manner to Example 1. Similarly, when a voltage is applied by the carbon electrode as the negative electrode and the silver electrode as the positive electrode, the structural color of the hollow structural body varies continuously from blue to yellow, to green, and to red, and when the voltage is reversed, the structural color varies from red to green, to yellow, and to blue.

Furthermore, even after the voltage is reversed many times, the similar behavior is observed; that is, an excellent reversibility similar to Example 1 is confirmed. Still furthermore, when the voltage application is stopped in this process, a color at the moment when the voltage is stopped is maintained, that is, an excellent memory property is also confirmed.

Example 5

An aqueous suspension of mono-disperse colloidal silica (a volume-average particle diameter of the colloidal particles is approximately 200 nm) is coated on a substrate, followed by vaporizing water in a thermostatic chamber at 100° C., so that a closest packed colloidal silica crystal structural body is prepared.

Next, pyrrole is flowed into the colloidal silica crystalline structural body as a mold to undergo the electrolytic polymerization so that gaps among particles of the structural body are filled with the pyrrole resin, followed by etching the colloidal silica crystal structural body with hydrofluoric acid, so that a hollow structural body made of the polypyrrole resin having a thickness of 0.1 mm is obtained. The obtained hollow structural body exhibits a structural color. Furthermore, when the hollow structural body is observed with a scanning electron microscope (SEM), it is observed that a porous body where gaps having the same shape as those of the colloidal silica crystal structural body are formed and all pores link to each other.

The hollow structural body is adhered onto a polyethylene terephthalate film (PET film) on which an indium-tin oxide (ITO) electrode is formed.

By the use of the PET film on which the hollow structural body and the ITO electrode are layered, an optical element having the hollow structural body as the periodic structural body 18, the ITO electrode as the first electrode 14, a silver electrode as the second electrode, and an aqueous solution of silver cyanide (concentration: 2 g/l, the refractive index: 0.18 to 0.34i) (FIG. 1) as the electrolytic solution 20, is prepared. As the transparent substrate 10 and the back substrate 12, a PET film is used. The resultant optical element has a film shape and a flexibility. When a voltage (a current density: 1.5 to 2.5 A/dm$^2$) is applied by an ITO electrode (the first electrode 14) of the optical element as a negative electrode and a silver electrode (the second electrode 16) side as a positive electrode, the structural color of the hollow structural body (periodic structural body 18) varies continuously from blue to yellow, to green, and to red similarly to Example 1; that is, a color control can be made continuously.

Furthermore, when the voltage is reversed, the structural color varies from red to green, to yellow, and to blue. Even after the voltage is reversed many times, the similar behavior is observed. That is, an excellent reversibility is confirmed.

Still furthermore, when the voltage application is stopped in this process, a color at the moment when the voltage is stopped is maintained, that is, an excellent memory property is also confirmed.

Furthermore, since the silver ion is contained in the electrolytic solution 20 and the silver electrode (the second electrode 16) that is brought into contact with the electrolytic solution are the same, when the metal ion deposits onto the hollow structural body, the silver ion is eluted from the silver electrode. Accordingly, the concentration of the silver ion in the electrolytic solution 20 becomes constant so that stable color control can be made.

Example 6

Except that a hollow structural body made of a polyacetylene resin is prepared with arsenic pentafluoride as a dopant and the polypyrrole resin replaced with a polyacetylene resin, an optical element is prepared in a similar manner to Example 5. A hollow structural body made of the polyacetylene resin forms a structural color same as that of the hollow structural body made of the polypyrrole resin in Example 5. Furthermore, the resultant optical element has a film shape and a flexibility.

When a voltage is applied to the obtained optical element, by the use of the ITO electrode as a negative electrode and the silver electrode as a positive electrode in a similar manner to Example 5, the structural color of the hollow structural body varies continuously from blue to yellow, to green, and to red; that is, the continuous color control can be made.

Furthermore, when the voltage is reversed, the structural color varies from red to green, to yellow, and to blue. Even after the voltage is reversed many times, the similar behavior is observed. That is, an excellent reversibility is confirmed. Still furthermore, when the voltage application is stopped in this process, a color at the moment when the voltage is stopped is maintained, that is, an excellent memory property is also confirmed.

Example 7

Except that a hollow structural body made of a polyphenylene vinylene resin is prepared with arsenic pentafluoride as a dopant and the polypyrrole resin replaced with the polyphenylene resin, an optical element is prepared in a similar manner to Example 5. A hollow structural body made of the polyphenylene resin forms a structural color same as that of the hollow structural body made of the polypyrrole resin in Example 5. Furthermore, the obtained optical element the resultant optical element has a film shape and a flexibility.

When a voltage is applied to the obtained optical element, with the ITO electrode as a negative electrode and the silver electrode as a positive electrode in a similar manner to Example 5, the structural color of the hollow structural body varies continuously from blue to yellow, to green, and to red; that is, the continuous color control can be made.

Furthermore, when the voltage is reversed, the structural color varies from red to green, to yellow, and to blue. Even after the voltage is reversed many times, the similar behavior is observed. That is, an excellent reversibility is confirmed. Still furthermore, when the voltage application is stopped in the midstream, a color at the moment when the voltage is stopped is maintained, that is, an excellent memory property is also confirmed.

Example 8

Except that a hollow structural body made of a poly (3,4-ethylene dioxythiophene) resin is prepared with arsenic pentafluoride as a dopant and the polypyrrole resin replaced with poly (3,4-ethylene dioxythiophene) resin, an optical element is prepared in a similar manner to Example 5. A hollow structural body made of the poly (3,4-ethylene dioxythiophene) resin forms a structural color same as that of the hollow structural body made of the polypyrrole resin in Example 5. Furthermore, the obtained optical element has a film shape and a flexibility.

When a voltage is applied to the obtained optical element, with an ITO electrode side as a negative electrode and a silver electrode as a positive electrode in a similar manner to Example 5, the structural color of the hollow structural body varies continuously from blue to yellow, to green, and to red; that is, the continuous color control can be made.

Furthermore, when the voltage is reversed, the structural color varies from red to green, to yellow, and to blue. Even after the voltage is reversed many times, the similar behavior is observed. That is, an excellent reversibility is confirmed. Still furthermore, when the voltage application is stopped in this process, a color at the moment when the voltage is stopped is maintained, that is, an excellent memory property is also confirmed.

Example 9

An aqueous suspension of mono-dispersed colloidal silica (a volume-average particle diameter of the colloidal particles is approximately 200 nm) is coated on a carbon electrode, followed by vaporizing water in a thermostatic chamber at 100° C., so that a closest packed colloidal silica crystalline structural body is prepared.

In the next place, the colloidal silica crystal structural body (including the carbon electrode) is immersed in a nickel electrolytic bath to electrolytically deposit nickel in gaps among particles of the structural body, followed by etching the silica colloid crystal structural body with hydrofluoric acid, so that a hollow structural body (the negative structural body: the refractive index 1.8 to 0.36i) made of nickel having a thickness of 0.5 mm is obtained. The obtained hollow structural body forms a structural color. Furthermore, when the hollow structural body is observed by the use of a scanning electron microscope (SEM), it is observed that a porous body is formed where gaps having the same shape as those of the colloidal silica crystalline structural body are formed and all pores link to each other.

By using the carbon electrode where the hollow structural body is layered, an optical element in which the hollow structural body is used as the periodic structural body 18, the carbon electrode is used as the first electrode 14, a silver electrode is used as the second electrode, and an aqueous solution of zinc cyanide (concentration: 50 g/l, the refractive index: 2.5 to 5.5i) (FIG. 1) is used as the electrolytic solution 20. As the transparent substrate 10 and the back substrate 12, a glass substrate is used.

When a voltage (the current density: 1.5 to 2.5 A/dm$^2$) is applied by a carbon electrode (the first electrode 14) of the optical element as a negative electrode and a silver electrode (the second electrode 16) as a positive electrode, the structural color of the hollow structural body (periodic structural body 18) varies continuously from blue to yellow, to green, and to red, zinc deposits on a surface of the hollow structural body, so that continuous color control with the variation of the refractive index due to the deposits can be made.

Furthermore, when the voltage is reversed, the structural color varies from red to green, to yellow, and to blue. Even after the voltage is reversed many times, a similar behavior is observed. That is, an excellent reversibility is confirmed. Still furthermore, when the voltage application is stopped in the process, a color at the moment when the voltage is stopped is maintained, that is, an excellent memory property is also confirmed.

Example 10

A hollow structural body made of carbon similar to the example 1 is pulverized to an extent that the structural color is not lost, so that a group of particles having a number-average particle diameter of 100 μm is obtained. The obtained group of the particles is adhered onto a carbon electrode in layer with a thickness of substantially 0.3 mm so that a periodic structural body 18 is obtained.

Except for the above, similarly to the example 1, an optical element is prepared. When a voltage is applied similarly with the carbon electrode side as the negative electrode and the silver electrode side as the positive electrode, similarly to the example 1, the reversible color control and the memory properties are exhibited. Furthermore, the same color is confirmed from any direction, that is, when the hollow structural body is pulverized, the viewing angle dependency of the structural color derived from the periodic structural body can be improved.

Example 11

Except that a solution of silver cyanide (solvent: lithium bis trifluoromethanesulfone imide (ionic liquid), concentration: 2 g/l, and the refractive index: 0.18 to 0.34i) is used as the electrolytic solution 20, similarly to the example 1, an optical element is prepared. When a voltage is applied similarly with a carbon electrode side as the negative electrode and a silver electrode as the positive electrode, the reversible color control and the memory properties are exhibited similarly to the example 1.

Furthermore, the obtained optical element is stored for one month in a thermostatic chamber at a temperature of 100° C. After the storage, there is no change in the volatilization of the solvent and the color control characteristics. Accordingly, it is confirmed that when the ionic liquid is used as a solvent, a stable element can be obtained.

Example 12

An aqueous suspension of mono-disperse silica colloid (a volume-average particle diameter of the colloidal particles is substantially 200 nm) is coated on a substrate, followed by vaporizing water in a thermostatic chamber at 100° C., so that a closest packed silica colloid crystal structural body is prepared.

Next, the silica colloid crystal structural body as a mold, into which styrene is poured to undergo the thermal polymerization, followed by filling polystyrene resin in gaps among particles of the structural body, further followed by etching the silica colloid crystal structural body with hydrofluoric acid, so that a hollow structural body (negative structural body: the refractive index, 1.6) made of the polystyrene resin and having a thickness of 10 μm is obtained. The obtained hollow structural body forms a structural color. Furthermore, when the hollow structural body is observed with a scanning electron microscope (SEM), it is observed that a porous body where a gap having a same shape as that of the colloidal silica crystal structural body is formed and all pores link to each other.

When a substrate on which the hollow structural body is layered is immersed in an electroless copper plating solution (A solution: copper sulfate+formalin, B solution: Rochelle salt+sodium hydroxide+sodium carbonate+EDTA+surfactant, and water: the refractive index, 1.40), the structural color of the hollow structural body varies continuously from blue to yellow, to green, and to red, and copper deposits on a surface of the hollow structural body (that is, the electroless plating). That is, a continuous color control can be made in accordance with the variation of the refractive index of the depositions. Thereby, it is confirmed that the color control can be made by the electroless plating. Furthermore, a color at that time when the hollow structural body is taken out of the electroless copper plating solution in the process remains as it is; that is, and it is also confirmed that the hollow structural body has an excellent memory property.

According to the invention, an optical composition for a multi-color display that can display multi-colors and has the memory properties and a manufacturing method thereof can be provided. In addition, the invention can provide also an optical element that makes use of the optical composition for a multi-color display and a displaying method thereof.

What is claimed is:

1. An optical composition for a multi-color display comprising:
    a medium containing metal ions; and
    a periodic structural body which is brought into contact with the medium, whereby the metal ions are deposited as metal atoms on a surface of the periodic structural body;
    the periodic structural body having a periodic structure in which two or more regions that have different refractive indices from each other are periodically arranged in a degree of sub-micro scale, and the refractive index varying with deposition of the metal ions on the surface of the periodic structural body to change color.

2. An optical composition for a multi-color display according to claim 1, wherein the periodic structural body is a photonic crystal structural body.

3. An optical composition for a multi-color display according to claim 1, wherein the periodic structural body is a hollow structural body.

4. An optical composition for a multi-color display according to claim 3, wherein the hollow structural body is made of a carbon material.

5. An optical composition for a multi-color display according to claim 1, wherein the periodic structural body comprises a powder group obtained by pulverizing a hollow structural body.

6. An optical composition for a multi-color display according to claim 1, wherein the metal ions deposit as metal atoms at an interface between the periodic structural body and the medium.

7. An optical composition for a multi-color display according to claim 1, wherein the medium contains an ionic liquid.

8. An optical element comprising:
    a medium containing metal ions;
    a periodic structural body which is brought into contact with the medium, whereby the metal ions are deposited as metal atoms on a surface of the periodic structural body; and an electrical field applying part that applies an electrical field to the periodic structural body;

the periodic structural body having a periodic structure in which two or more regions that have different refractive indices from each other are periodically arranged in a degree of sub-micro scale, and the refractive index varying with deposition of the metal ions on the surface of the periodic structural body to change color.

9. An optical element according to claim 8, wherein the electrical field applying part comprises an electrically conductive material.

10. An optical element according to claim 8, wherein the electrical field applying part is a pair of electrodes comprising a first electrode and a second electrode.

11. An optical element according to claim 10, wherein
the first electrode is disposed so as to come into contact with the periodic structural body; and
the second electrode is disposed so as to come into contact with the medium and is formed of the same metal as the metal ions.

12. A display method using an optical element, comprising:
providing a medium containing metal ions; a periodic structural body which is brought into contact with the medium to deposit the metal ions as metal atoms on a surface of the periodic structural body, and an electrical field applying part for applying an electrical field to the periodic structural body; the periodic structural body having a periodic structure in which two or more regions that have different refractive indices from each other are periodically arranged in a degree of sub-micro scale, and the refractive index varying with deposition of the metal ions on the surface of the periodic structural body to change color;

applying an electrical field to the periodic structural body to deposit metal ions in the medium as metal atoms, the medium contacting the surface of the periodic structural body; and applying an electrical field that is opposite to the electrical field to elute the deposited metal atoms into the medium as metal ions.

13. A display method using an optical element according to claim 12, wherein a color is controlled in accordance with an amount of the deposited metal atoms.

14. A method of manufacturing an optical composition for a multi-color display comprising a medium containing metal ions and a periodic structural body that is brought into contact with the medium to deposit the metal ions as metal atoms on a surface of the periodic structural body; the method comprising:
filling gaps among particles of a colloidal crystalline structural body with an electrically conductive material;
removing the colloidal crystal to prepare the periodic structural body, the periodic structural body having a periodic structure in which two or more regions that have different refractive indices from each other are periodically arranged in a degree of sub-micro scale, and the refractive index varying with deposition of the metal ions on the surface of the periodic structural body to change color.

* * * * *